United States Patent
Fischer

(10) Patent No.: US 9,131,511 B2
(45) Date of Patent: Sep. 8, 2015

(54) BACKOFF SNOOZE WAKE POWER CONSUMPTION WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventor: Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 149 days.

(21) Appl. No.: 13/739,847

(22) Filed: Jan. 11, 2013

(65) Prior Publication Data

US 2013/0194992 A1 Aug. 1, 2013

Related U.S. Application Data

(60) Provisional application No. 61/585,609, filed on Jan. 11, 2012.

(51) Int. Cl.
*H04W 52/02* (2009.01)
*H04W 74/08* (2009.01)
(Continued)

(52) U.S. Cl.
CPC ......... *H04W 74/0816* (2013.01); *H04L 5/0007* (2013.01); *H04L 27/2601* (2013.01); *H04L 27/38* (2013.01); *H04W 52/0229* (2013.01);
(Continued)

(58) Field of Classification Search
USPC ........... 370/210, 311–312, 336–338; 455/574
See application file for complete search history.

(56) References Cited

U.S. PATENT DOCUMENTS

2002/0016151 A1* 2/2002 Romans ........................ 455/13.4
2003/0103521 A1* 6/2003 Raphaeli et al. .............. 370/445
(Continued)

FOREIGN PATENT DOCUMENTS

WO 2007018713 A3 2/2007

OTHER PUBLICATIONS

International Searching Authority; International Search Report and Written Opinion; International Application No. PCT/US13/21297; Mar. 22, 2013; 7 pgs.

*Primary Examiner* — Curtis A Alia
*Assistant Examiner* — Steven Willmore
(74) *Attorney, Agent, or Firm* — Garlick & Markison; Shayne X. Short

(57) ABSTRACT

Backoff snooze wake power consumption within single user, multiple user, multiple access, and/or MIMO wireless communications. If a communication (e.g., transmission) attempt fails (e.g., by a wireless station (STA), smart meter station (SMSTA), etc.), then a backoff snooze countdown may be performed before a subsequent communication is attempted. Also, if communication activity is detected on the communication medium, then such a backoff snooze countdown may be performed before monitoring the communication medium or a subsequent communication attempt is made. Such a backoff snooze countdown may be based on a codeword value (e.g., such as provided within a beacon received from an access point (AP)), and different respective backoff snooze countdowns may be made based on different respective codeword values. Such backoff snooze countdowns are performed outside of a restricted access window (RAW) in which only devices of a particular class (e.g., low-power, Z, etc.) have access to the communication medium.

20 Claims, 11 Drawing Sheets

(51) Int. Cl.
  *H04W 72/06* (2009.01)
  *H04L 5/00* (2006.01)
  *H04L 27/26* (2006.01)
  *H04L 27/38* (2006.01)
  *H04W 72/12* (2009.01)
  *H04W 56/00* (2009.01)

(52) U.S. Cl.
  CPC .......... *H04W 72/06* (2013.01); *H04W 52/0219* (2013.01); *H04W 56/0015* (2013.01); *H04W 72/12* (2013.01); *Y02B 60/50* (2013.01)

(56) References Cited

U.S. PATENT DOCUMENTS

| | | | |
|---|---|---|---|
| 2007/0211748 A1* | 9/2007 | Stephens | 370/445 |
| 2008/0009328 A1* | 1/2008 | Narasimha | 455/574 |
| 2008/0219210 A1* | 9/2008 | Shuey et al. | 370/329 |
| 2009/0103501 A1* | 4/2009 | Farrag et al. | 370/337 |
| 2009/0160639 A1* | 6/2009 | Chu | 340/539.11 |
| 2010/0099358 A1 | 4/2010 | Kumar et al. | |
| 2010/0142365 A1* | 6/2010 | Richardson et al. | 370/210 |
| 2011/0134818 A1* | 6/2011 | Bae et al. | 370/311 |
| 2011/0182178 A1* | 7/2011 | Du et al. | 370/230 |
| 2011/0222486 A1* | 9/2011 | Hart | 370/329 |
| 2013/0049939 A1* | 2/2013 | Vijayasankar et al. | 340/13.23 |
| 2013/0106616 A1* | 5/2013 | Gustafsson et al. | 340/870.02 |
| 2013/0128798 A1* | 5/2013 | Liu | 370/312 |
| 2013/0148589 A1* | 6/2013 | Smith et al. | 370/329 |
| 2013/0235770 A1* | 9/2013 | Merlin et al. | 370/311 |
| 2013/0315121 A1* | 11/2013 | Sampathkumar | 370/311 |
| 2013/0336234 A1* | 12/2013 | Ghosh et al. | 370/329 |

\* cited by examiner

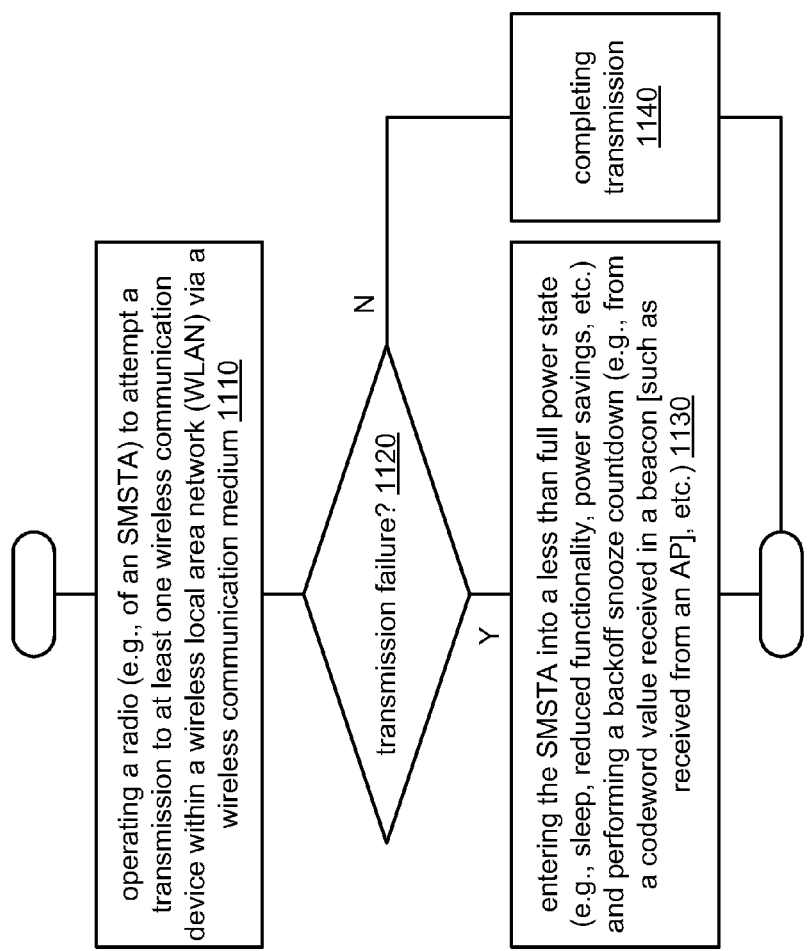

US 9,131,511 B2

BACKOFF SNOOZE WAKE POWER CONSUMPTION WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Patent Application Ser. No. 61/585,609, entitled "Media access control (MAC) for single user, multiple user, multiple access, and/or MIMO wireless communications,", filed Jan. 11, 2012, pending.

INCORPORATION BY REFERENCE

1. U.S. Utility patent application Ser. No. 13/739,863, entitled "Target wake time (TWT) within single user, multiple user, multiple access, and/or MIMO wireless communications,", filed concurrently on Jan. 11, 2013, pending.

2. U.S. Utility patent application Ser. No. 13/739,821, entitled "One or multiple bit restricted access window (RAW) end point determination within for single user, multiple user, multiple access, and/or MIMO wireless communications,", filed concurrently on Jan. 11, 2013, pending.

INCORPORATION BY REFERENCE

The following IEEE standards/draft standards are hereby incorporated herein by reference in their entirety and are made part of the present U.S. Utility patent application for all purposes:

1. IEEE Std 802.11™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).

3. IEEE P802.11ac™/D4.1, November 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 420 total pages (incl. pp. i-xxv, 1-395).

4. IEEE P802.11ad™/D9.0, July 2012, (Draft Amendment based on IEEE 802.11-2012) (Amendment to IEEE 802.11-2012 as amended by IEEE 802.11ae-2012 and IEEE 802.11aa-2012), "IEEE P802.11ad™/D9.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 679 total pages.

5. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

6. IEEE P802.11af™/D2.2, November 2012, (Amendment to IEEE Std 802.11™-2012, as amended by IEEE Std 802.11ae™-2012, IEEE Std 802.11aa™-2012, IEEE Std 802.11ad™/D9.0, and IEEE Std 802.11ac™/D4.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 324 total pages (incl. pp. i-xxiv, 1-300).

BACKGROUND OF THE INVENTION

1. Technical Field of the Invention

The invention relates generally to communication systems; and, more particularly, it relates to power and/or energy consumption and/or savings within single user, multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

In some instances, wireless communication between a transmitter and receiver is a single-output-single-input (SISO) communication, even if the receiver includes multiple antennae that are used as diversity antennae (i.e., selecting one of them to receive the incoming radio frequency (RF) signals). For SISO wireless communications, a transceiver includes one transmitter and one receiver. Currently, most wireless local area networks (WLAN) (e.g., IEEE 802.11, 802.11a, 802.11b, 802.11g) employ SISO communications.

Other types of wireless communications include single-input-multiple-output (SIMO) (e.g., a single transmitter processes data into RF signals that are transmitted to a receiver that includes two or more antennae and two or more receiver paths), multiple-input-single-output (MISO) (e.g., a transmitter includes two or more transmission paths (e.g., digital to analog converter, filters, up-conversion module, and a power amplifier) that each converts a corresponding portion of baseband signals into RF signals, which are transmitted via corresponding antennae to a receiver), and multiple-input-multiple-output (MIMO) (e.g., a transmitter and receiver each include multiple paths such that a transmitter parallel processes data using a spatial and time encoding function to produce two or more streams of data and a receiver receives the multiple RF signals via multiple receiver paths that recapture the streams of data utilizing a spatial and time decoding function).

BRIEF DESCRIPTION OF THE SEVERAL VIEWS OF THE DRAWINGS

FIG. 10 and FIG. 11 are diagrams illustrating embodiments of methods for operating one or more wireless communication devices.

DETAILED DESCRIPTION OF THE INVENTION

Figure 1:
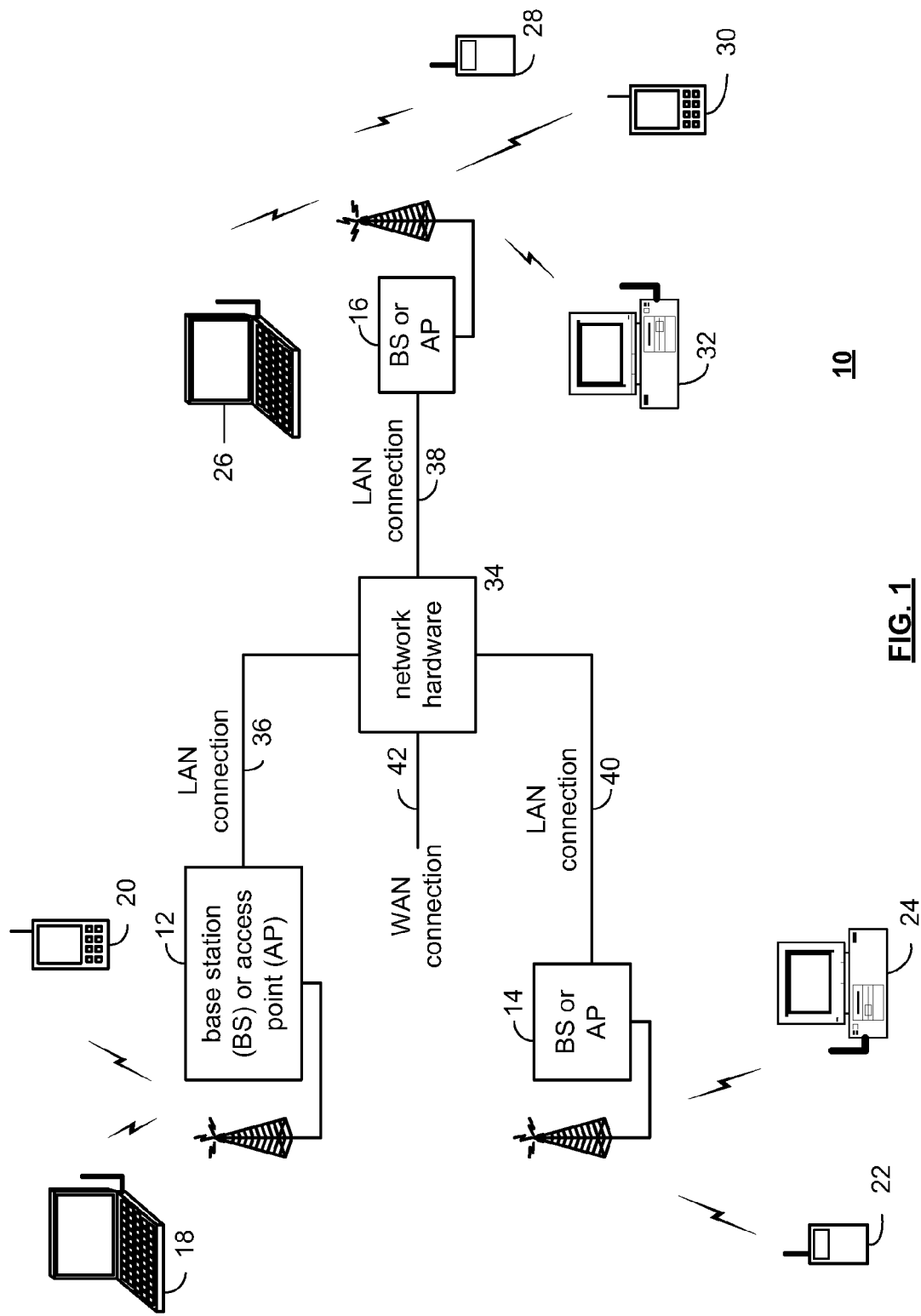
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
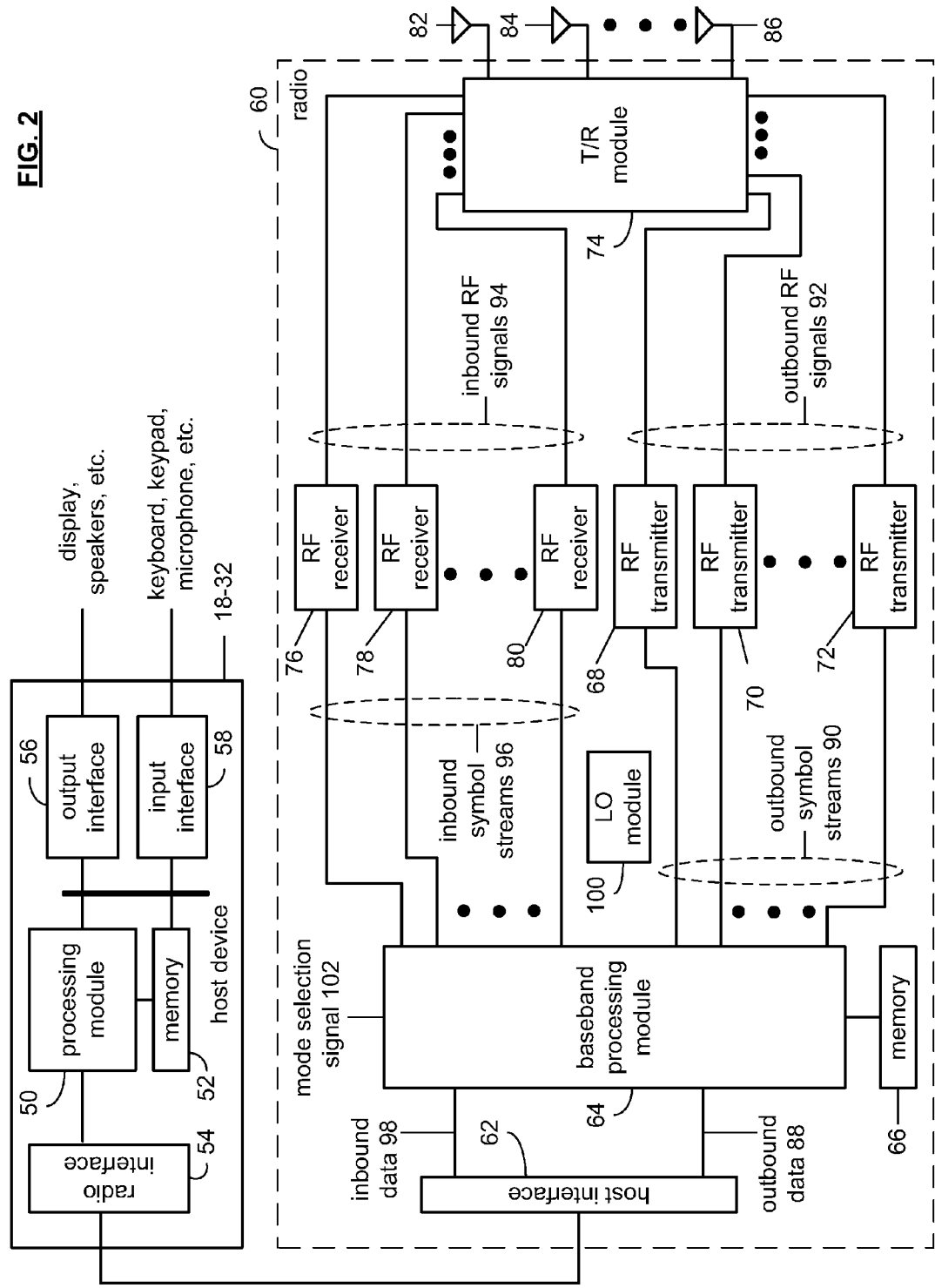
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables as may be understood by the reader. For example, the mode selection signal 102 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. Also, in such mode selection tables, a code rate is supplied as well as number of coded bits per subcarrier (NBPSC), coded bits per OFDM symbol (NCBPS), data bits per OFDM symbol (NDBPS). The mode selection signal may also indicate a particular channelization for the corresponding mode which for the information in one of the mode selection tables with reference to another of the mode selection tables. It is of course noted that other types of channels, having different bandwidths, may be employed in other embodiments without departing from the scope and spirit of the invention.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode selection signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received (recall that the mode may be any one of the mode selection tables referenced elsewhere herein). The baseband processing module 64 receives the inbound symbol streams 96 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
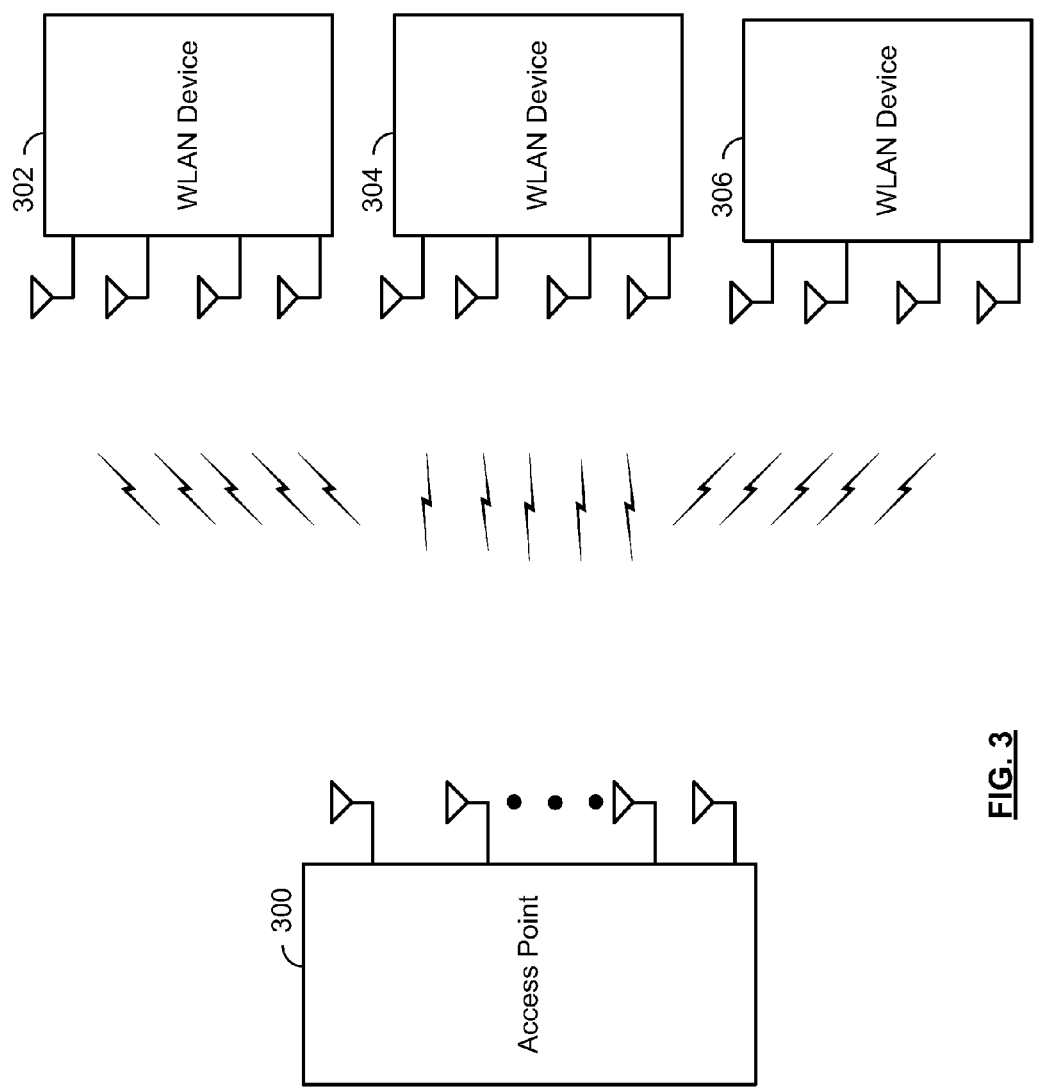
FIG. 3 is a diagram illustrating an embodiment of an access point (AP) and multiple wireless local area network (WLAN) devices operating according to one or more various aspects and/or embodiments of the invention.

FIG. 3 is a diagram illustrating an embodiment of an access point (AP) and multiple wireless local area network (WLAN) devices operating according to one or more various aspects and/or embodiments of the invention. The AP point 300 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 300 supports communications with the WLAN devices 302, 304, and 306 with channel bandwidths, MIMO dimensions, and at data throughput rates unsupported by the prior IEEE 802.11x operating standards. For example, the access point 300 and WLAN devices 302, 304, and 306 may support channel bandwidths from those of prior version devices and from 40 MHz to 1.28 GHz and above. The access point 300 and WLAN devices 302, 304, and 306 support MIMO dimensions to 4×4 and greater. With these characteristics, the access point 300 and WLAN devices 302, 304, and 306 may support data throughput rates to 1 GHz and above.

The AP 300 supports simultaneous communications with more than one of the WLAN devices 302, 304, and 306. Simultaneous communications may be serviced via OFDM tone allocations (e.g., certain number of OFDM tones in a given cluster), MIMO dimension multiplexing, or via other techniques. With some simultaneous communications, the AP 300 may allocate one or more of the multiple antennae thereof respectively to support communication with each WLAN device 302, 304, and 306, for example.

Further, the AP 300 and WLAN devices 302, 304, and 306 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of the sets of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 4:
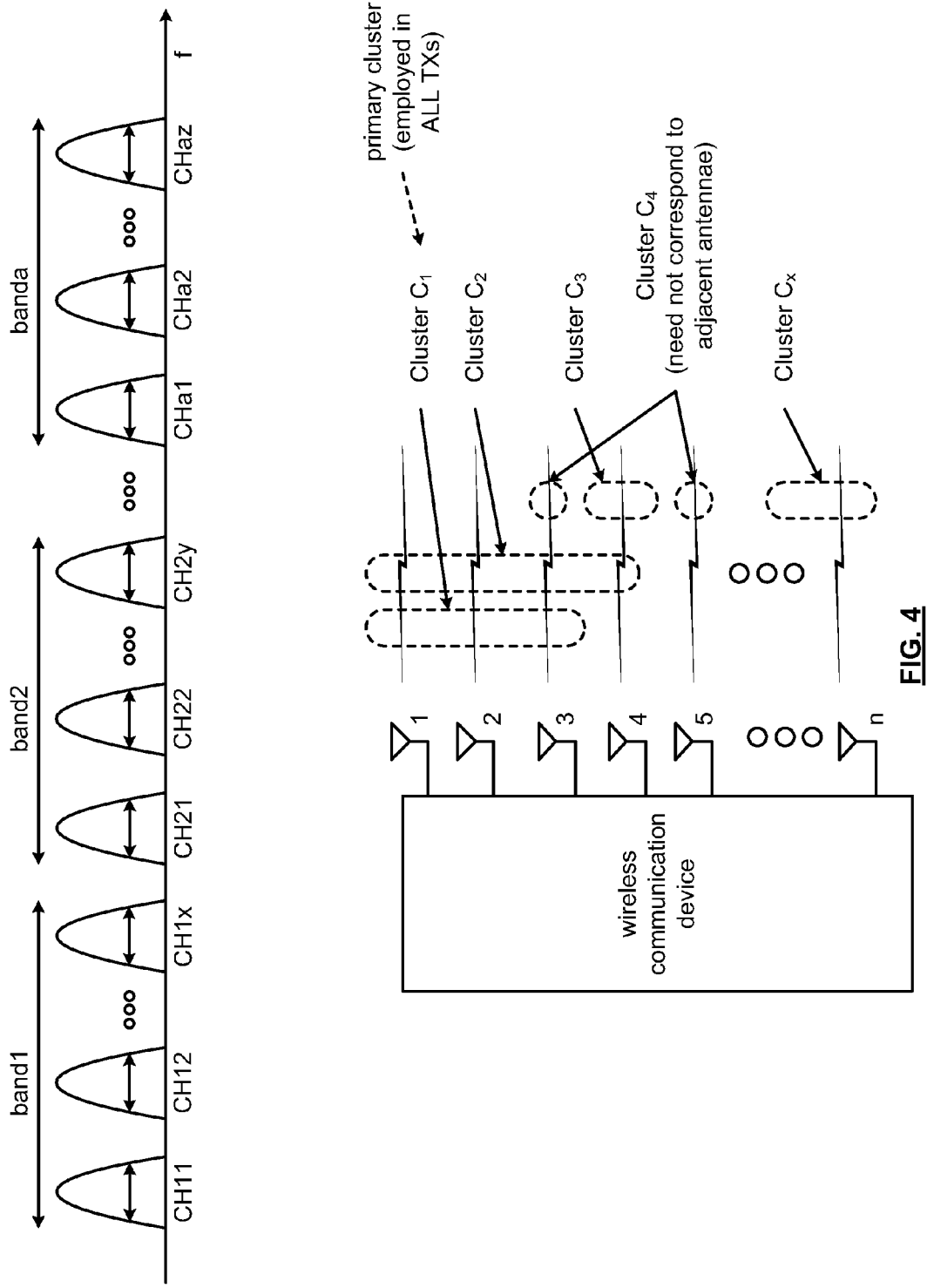
FIG. 4 is a diagram illustrating an embodiment of a wireless communication device, and clusters, as may be employed for supporting communications with at least one additional wireless communication device.

FIG. 4 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination of one or more channels among one or more bands.

As may be understood, different respective bands may have different respective numbers of channels. Such orthogonal frequency division multiplexing (OFDM) tones may be distributed among one or more clusters. A given cluster may be defined as follows:

cluster=fnc(1+ CHs, 1+ bands, or any combination thereof) [e.g., cluster1(CH11, CH12, CH1x), cluster2(CH11, CHa1), cluster3(CH11, CH12, CH2x, CHax), etc.].

it is also noted that each one or more cluster may be selectable communication among any one or more antennae to one or more receivers.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

Figure 5:
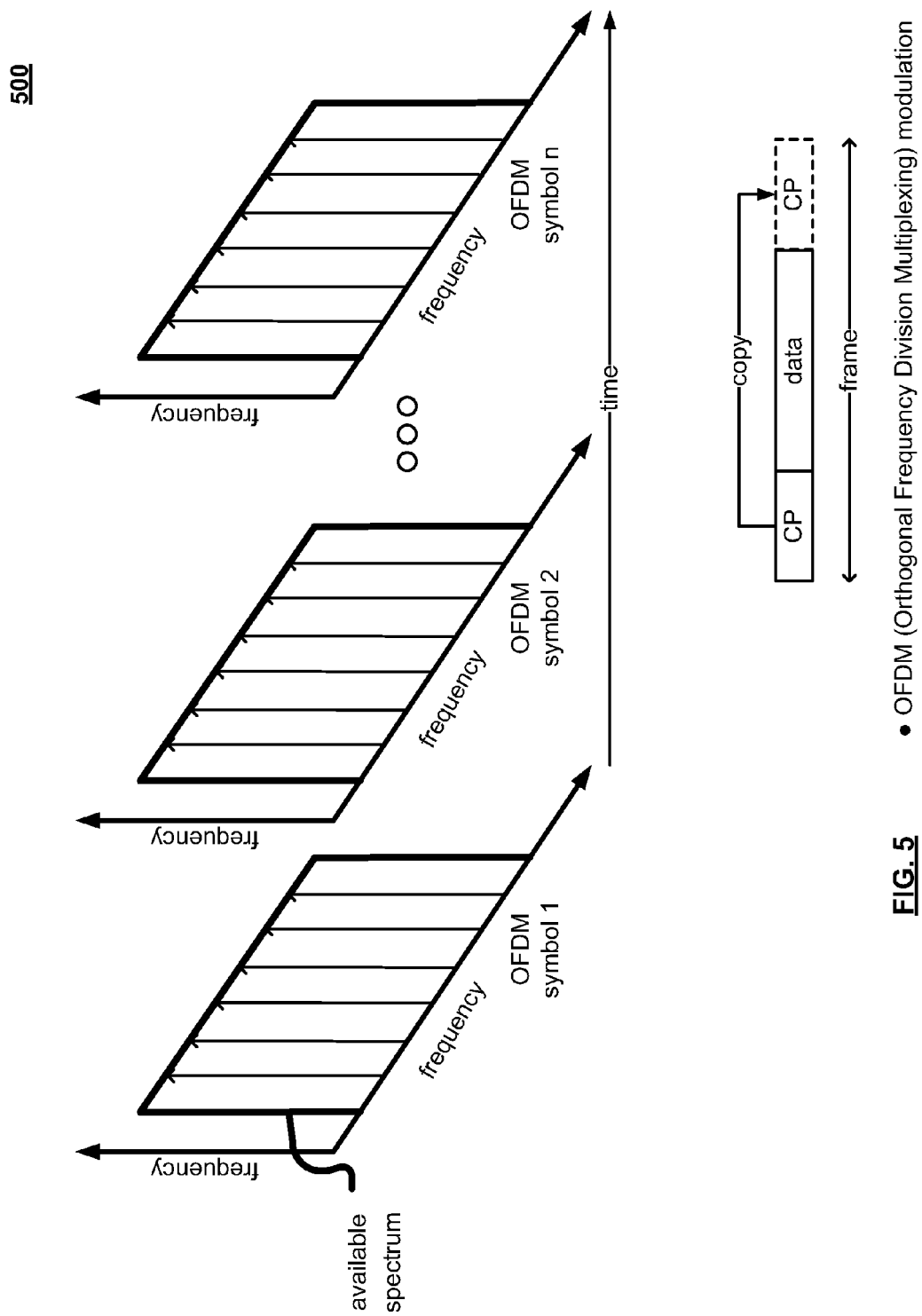
FIG. 5 illustrates an embodiment of OFDM (Orthogonal Frequency Division Multiplexing).

FIG. 5 illustrates an embodiment 500 of OFDM (Orthogonal Frequency Division Multiplexing). OFDM modulation may be viewed as dividing up an available spectrum into a plurality of narrowband sub-carriers (e.g., lower data rate carriers). The available spectrum may be viewed as being divided into multiple narrowband sub-carriers (multi-tones). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. For example, each OFDM symbol may include a CP (Cyclic Prefix) and guard interval allowing switching time. Such CPs may operate to facilitate an efficient form of equalization. Generally speaking, OFDM system design is based on the expected delay spread within the communication system (e.g., the expected delay spread of the communication channel).

In certain instances, various wireless communication devices may be implemented to support communications associated with monitoring and/or sensing of any of a variety of different conditions, parameters, etc. and provide such information to another wireless communication device. For example, in some instances, a wireless communication device may be implemented as a smart meter station (SMSTA), having certain characteristics similar to a wireless station (STA) such as in the context of a wireless local area network (WLAN), yet is operative to perform such communications associated with one or more measurements in accordance with monitoring and/or sensing. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode [such as 1%, 5%, 10%, etc.]). Generally speaking, such a SMSTA may operate in the less than full power state for at least one order of magnitude relatively longer time duration than in the full power state (e.g., 10× as much time spent in the less than full power state than in the full power state).

For example, such a device may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.). It is noted that such a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data as is acquired during those operations may be stored (e.g., in a memory storage component within the device), and during a subsequent operational mode dedicated for transmission of the data, multiple data portions corresponding to multiple respective sensing and/or monitoring operations may be transmitted during that operational mode dedicated for transmission of the data.

Also, it is noted that, in certain embodiments, such a device may include both monitoring and/or sensor capability as well as wireless communication capability. In other embodiments, such a device may be connected and/or coupled to a monitor and/or sensor and serve to effectuate wireless communications related to the monitoring and/or sensing operations of the monitor and/or sensor.

The application contexts of such devices may be varied, and some exemplary though non-exhaustive embodiments are provided in described below for illustrations the reader. It is also noted that, in some applications, some of the devices may be battery operated in which energy conservation and efficiency may be of high importance. In addition, there are a number of applications in which such devices may be used besides in accordance with smart meter applications; for example, certain wireless communication devices may be implemented to support cellular offload and/or other applications that are not normally or traditionally associated with WLAN applications. Some applications are particularly targeted and directed towards use in accordance with and in compliance with the currently developing IEEE 802.11ah standard.

Various mechanisms by which access to the communication media may be achieved may be different and particularly tailored for different contexts. For example, different communication access schemes may be applied at different respective times. That is to say, during a first time or during a first time period, a first communication medium access approach may be employed. During a second time or during a second time period, a second communication medium access approach may be employed. It is noted that the particular communication medium access approach employed at any given time may be adaptively determined based upon one or more prior communication medium access approaches employed during one or more time periods.

Also, in an application in which there are multiple wireless communication devices implemented therein, different respective time periods may be employed for different groups of those wireless communication devices. For example, considering an embodiment in which multiple STAs are operative within a given communication device, those respective STAs may be subdivided into different respective groups that may have access to the communication medium a different respective time periods. It is noted that any one given STA may be categorized within more than one group, in that, different respective groups of STAs may have some overlap in their respective contents. By using different respective time periods for use by different respective groups of devices, an increase in media access control (MAC) efficiency may be achieved among any one or more of the respective devices within the wireless communication system. Also, by ensuring appropriate operation of the overall system, power consumption may be decreased as well. As mentioned above, this can be of utmost importance in certain applications such as those in which one or more of the devices are battery operated and energy conservation is of high importance. Also, utilizing different respective time periods for use by different groups of STAs can allow for simplification in accordance with MAC or physical layer (PHY) processing. For example, certain embodiments may employ preamble processing (e.g., such as in accordance with distinguishing between normal range and/or extended range type communications) for simplification. In addition, the MAC protocol employed for certain respective time periods can be simplified.

It is noted that the in accordance with various aspects, and their equivalents, of the invention described herein may be generally applied to wireless communication devices including any number of types of wireless communication devices (e.g., STAs, APs, SMSTAs, and/or any combination thereof, etc.), certain desired embodiments are particularly tailored towards use with one or more SMSTAs.

Figure 6:
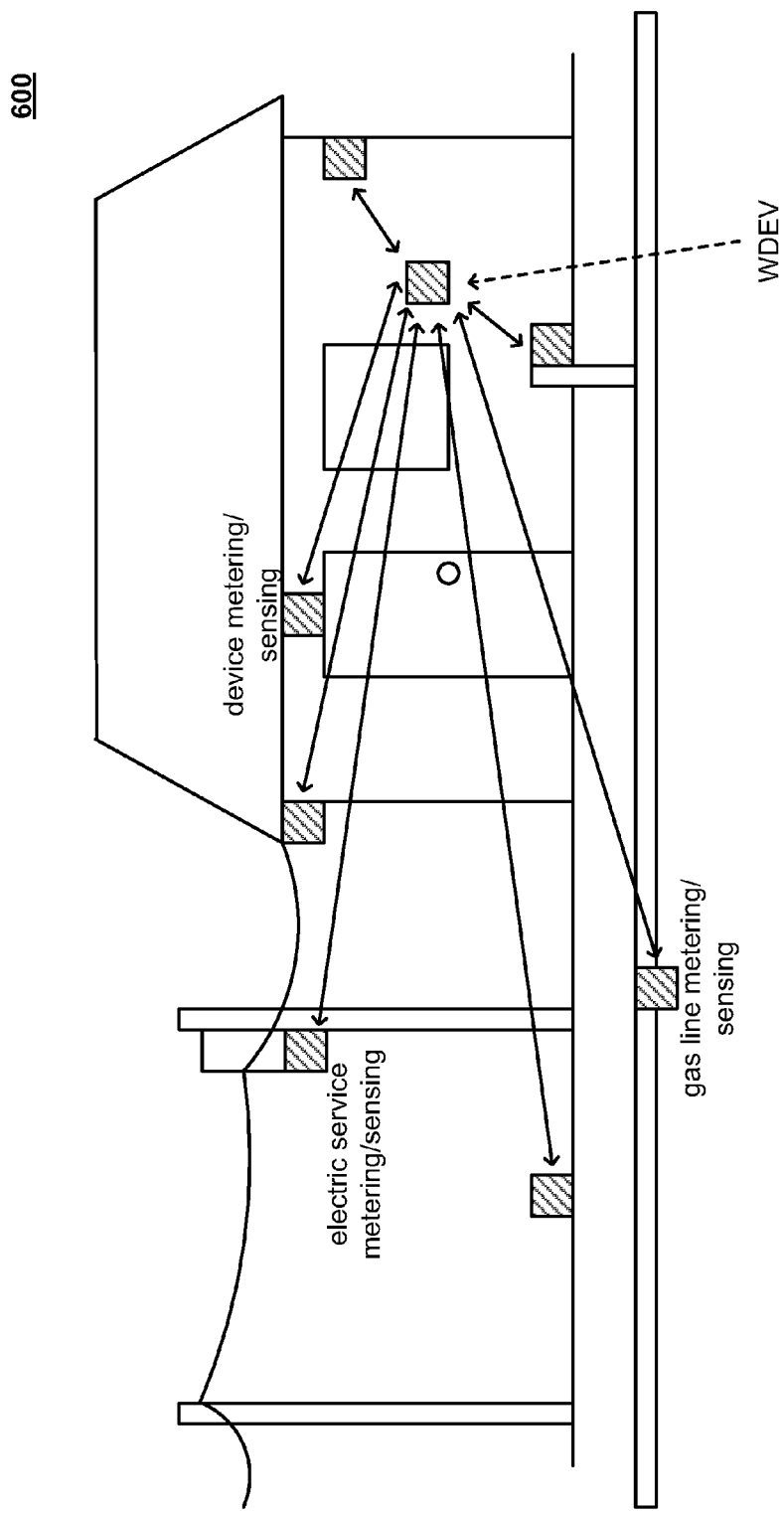
FIG. 6 illustrates an embodiment of a number of wireless communication devices implemented in various locations in an environment including a building or structure.

FIG. 6 illustrates an embodiment 600 of a number of wireless communication devices implemented in various locations in an environment including a building or structure. In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP. For example, any such wireless communication device (WDEV) may be viewed as operating as a manager, a coordinator, etc. (e.g., AP, STA operating as AP, etc.). Generally speaking, such wireless communication devices may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, temperature measurement (and/or other atmospheric and/or environmental measurements), etc. may be performed by different respective monitors and/or sensors implemented in various locations and for various purposes. Also, any one or more of such wireless communication devices (WDEVs) may be implemented in various locations (e.g., inside &/or outside, above &/or below ground, meters [gas, electric, etc.], sensors [motion, temperature, etc.], etc.).

Different respective monitors and/or sensors may be implemented to provide information related to such monitoring and/or sensing functions wirelessly to the manager/coordinator wireless communication device. Such information may be provided continuously, sporadically, intermittently, etc. as may be desired in certain applications.

In addition, it is noted that such communications between such a manager/coordinator wireless communication device of the different respective monitors and/or sensors may be cooperative in accordance with such bidirectional indications, in that, the manager/coordinator wireless communication device may direct the respective monitors and/or sensors to perform certain related functions at subsequent times.

Figure 7:
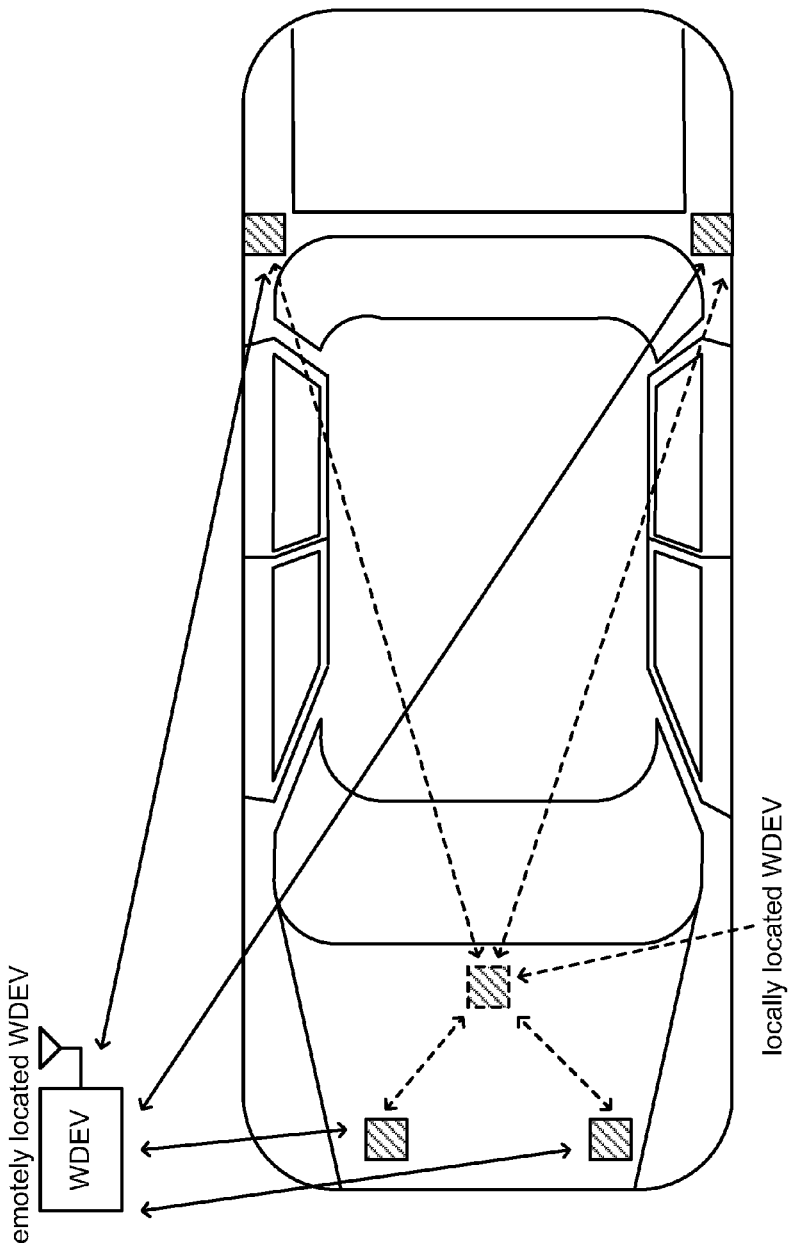
FIG. 7 illustrates an embodiment of a number of wireless communication devices implemented in various locations in a vehicular environment.

FIG. 7 illustrates an embodiment 700 of a number of wireless communication devices implemented in various locations in a vehicular environment. This diagram pictorially depicts a number of different sensors implemented throughout a vehicle which may perform any of a number of monitoring and/or sensing functions. For example, operational characteristics associated with different mechanical components (e.g., temperature, operating condition, etc. of any of a number of components within the vehicle, such as the engine, compressors, pumps, batteries, etc.) may all be monitored and information related to that monitoring may be provided to a coordinator/manager wireless communication device. As may be understood, a remotely located wireless communication device (WDEV) may be viewed as operating as a manager, a coordinator, etc. (e.g., AP, STA operating as AP, etc.). Also, a locally located wireless communication device (WDEV) may also be viewed or implemented as operating as a manager, a coordinator, etc. (e.g., AP, STA operating as AP, etc.). Also, any one or more of such wireless communication devices (WDEVs) may be implemented in various locations (e.g., inside or outside vehicle, meters [gas, electric, etc.], sensors [motion, temperature, etc.], etc.).

Figure 8:
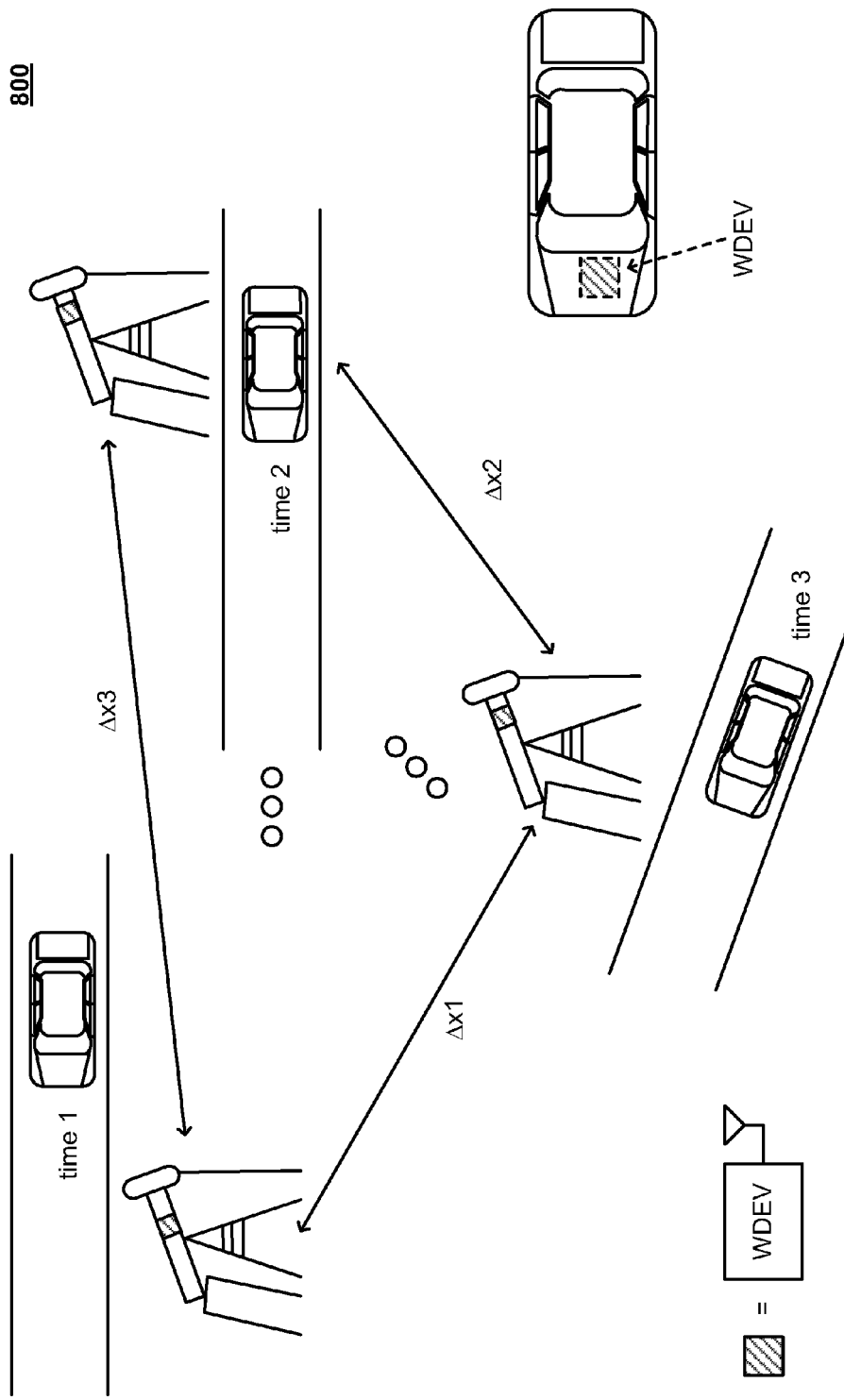
FIG. 8 illustrates an embodiment of a number of wireless communication devices implemented in various locations throughout a broadly distributed industrial environment.

FIG. 8 illustrates an embodiment 800 of a number of wireless communication devices implemented in various locations throughout a broadly distributed industrial environment. This diagram pictorially illustrates a number of different respective sensors that may be implemented in various locations that are very remote with respect to one another. This diagram relates to a number of sensors that may be implemented within different locations that have little or no wireless communication infrastructure associated therewith. For example, in the oil industry, different respective pumps may be implemented in very remote locations, and service personnel need physically to visit the different respective locations to ascertain the operation of the various equipment and components there. A manager/coordinator wireless communication device may be implemented within a vehicle, or within a portable component such as laptop computer included within the vehicle, and as the vehicle travels to each respective location in which there are such sensing and/or monitoring devices. As the manager/coordinator wireless communication device enters within sufficient proximity such that wireless communication may be supported with the different respective sensing and/or monitoring devices, information related to such monitoring and/or sensing functions may be provided to the manager/ordinate wireless communication device.

While various respective and exemplary embodiments have been provided here for illustration to the reader, it is noted that such applications are non-exhaustive and that any of a variety of application contexts may be implemented such that one or more wireless communication devices are implemented throughout an area such that those one or more wireless communication devices may only occasionally provide information to a manager/ordinate wireless communication device. Any such application or communication system may operate in accordance with various aspects, and their equivalents, of the invention.

Generally speaking, certain embodiments and implementations of wireless communication devices may include a number of different types of device classes. For example, multiple respective device classes may exist within a single basic services set (BSS) (e.g., such as in accordance with a BSS operating in accordance with TGah). Moreover, not only may such a BSS include a number of different devices corresponding to different respective classes, but even within those devices within a given class (e.g., smart meters, sensors, etc.), there may be an extremely broad range during which certain of those respective devices are operational. For example, some of the devices will only be awake and operational during a first very large range (e.g., such as every few months, or on a monthly basis, etc.), other devices may be awake and operational during a second relatively smaller range (e.g., such as every few weeks or days, or on a daily or weekly basis, etc.), and yet even other devices may be awake and operational during a third relatively smaller range (e.g., such as every few hours, minutes, or on an hourly or minute type basis, etc.). As may be understood, there may be a very broad dynamic range over which such devices may be awake and operational. As may be understood, any such wireless communication device (WDEV) may be viewed as operating as a manager, a coordinator, etc., (e.g., AP, STA operating as AP, etc.), implemented to access other respective WDEVs when in range. Also, such wireless communication devices (WDEVs) may also be implemented in remote locations with little/no infrastructure (e.g., inside or outside vehicle, meters [gas, electric, etc.], sensors [motion, temperature, etc.], etc.).

Also, with respect to such embodiments including different types of devices, access to the communication medium (e.g., access to the air) should be effectively shared in an equitable manner. Of course, there may be certain different as well as overlapping performance goals among these different respective devices, and access to the communication medium should be provided in view of meeting such various performance goals.

Generally speaking, various novel communication medium access rules are provided herein for operation of different respective devices to allow for equitable coexistence there among. For example, certain different rules may be provided on a per device class basis to ensure that different respective classes of devices will have access to the communication medium in an equitable manner.

In accordance with operating a communication device having different respective devices of different respective classes, a general categorization of such device classes may be provided as follows:

Multiple Device Classes

1. Z Class=Low traffic, low power consumption, e.g., smart meter, sensor, etc.

Such Z class devices may be viewed as those which typically need relatively low frequency periodic service. That is to say, such devices are not typically operational for extended periods of time or at relatively high frequencies (e.g., of operation, that is). Such Z class devices generally may be viewed as spending a majority of their time being a sleep, in a reduced operational mode state, etc. As may be understood with respect to such devices, relatively long battery life may be desirable. In accordance with certain smart meter and/or sensor applications, it may be desirable such that such maintenance thereof, such as with respect to battery replacement, be performed on a multi-year type basis. As may be understood with respect to energy conservation with respect to such devices, and may be desirable to minimize power consumption during respective wake intervals during which such a devices operational. When such a device exits from a sleep or reduced operational state, minimizing the time required to listen to activity on the communication medium before transmitting may effectively extend battery life. Also, minimizing retransmissions may also be effective to extend battery life.

2. H class=High traffic, modest power consumption, e.g., handset, etc.

Such H class devices may be viewed as those which typically operate in accordance with bursty type traffic, such that while traffic may be provided in relatively bursty communications. Maximization of battery life (e.g., such as providing a relatively low power requirement) may be characteristic of such devices. Also, minimization of power consumption during wake intervals during which such a device is operational may also be characteristic of such devices.

Device Class Definitions

Generally speaking, there may be some instances in which classification of a device as belonging to one class or another may be difficult. That is to say, there may be some common characteristics and/or overlapping characteristics associated with a device corresponding to two or more respective classes.

For example, with respect to Z class, if a power savings device (e.g., a PS wireless station (PS STA)) has not made a transmission or communication within a particular period of time (e.g., the previous 60 seconds), then the device may be characterized as belonging to the Z class. However, if such a power savings device has in fact made a transmission of communication within such a period of time, then that given device may be categorized as belonging to the H class. Generally speaking, those devices that do not operate in accordance with a power savings operational mode may generally be characterized as belonging to the H class (e.g., a non-power savings operational STA may be categorized as belonging to the H class).

However, it is also noted that class membership of the different respective devices is dynamic, in that, a given device may be categorized as belonging to one class during a first time or first period of time, and that same device may be categorized as belonging to a second class during a second time or second period of time. That is to say, a given device may change its class back and forth on a desired temporal resolution (e.g., such as changing categorization of class back and forth on a 60 second resolution).

Alternatively, class membership may be made in accordance with a static assignment in accordance with an expected traffic profile which may be included within an association exchange between devices. In such an embodiment, class membership may be static such that the respective assignment of a given device may not dynamically be made across a number of classes at different respective times.

Heterogeneous Network

As may be understood with respect to such communication systems and networks implementing different respective devices corresponding to two or more different respective classes, H class devices may be operative to create certain respective periods of relatively high load and bandwidth consumption (e.g., relatively high consumption of the available resources over which communications may be made within the communication system or network). In such an embodiment in which one or more H class devices create periods of high load, the probability of individual respective Z class devices waking to an idle network correspondingly decreases. That is to say, as a number of H class devices increases and more respective H class devices are operative thereby creating periods of high load with respect to the communication system or network, the intermittent busyness of the communication system or network may unfortunately cause problems for energy and/or battery consumption of certain Z class devices. For example, when such Z class devices awake and listen for an opportunistic period during which transmissions may be made, if there is an inordinate amount of activity on the network, such devices may not be able to transmit and consequently will expand energy and/or battery power.

For example, such a situation may arise with respect to a single BSS that is shared by outdoor smart meter network and handset offload service. Given service area, it is possible that there is nearly always a handset sending/receiving a burst of traffic. As may be understood, waking low-traffic devices (e.g., Z class devices) frequently wake to busy medium in accordance with such a situation in which H class devices create periods of high load to a communication system or network, and such low-traffic devices (e.g., Z class devices) might not even know that the communication medium is busy because of hidden node problems.

Interactions Between Different Respective Device Classes

1. H with H: Interactions between such devices may be characterized as being mostly awake when attempting to transmit, allowing synchronization with medium state. Generally speaking, such interaction may be implemented to perform in accordance with certain existing IEEE 802.11 systems, standards, protocols, and/or recommended practices. However, in the situation in which different respective hidden nodes may exist, certain considerations may be made in addition to certain existing IEEE 802.11 systems, standards, protocols, and/or recommended practices.

2. Z with Z: Interactions between such devices may be characterized as being mostly asleep such that the different respective Z class devices have a relatively low probability of interacting with one another. However, it is noted that such is the class devices are not guaranteed not to interact with one another. The probability of interaction between such Z class devices may be decreased if desired and according to certain operations.

3. H with Z: Interactions between such devices may be characterized as being of relatively high activity rate combined with certain hidden node problems and/or issues. Such hidden node problems and/or issues may unfortunately cause excessive power consumption for awake Z class devices, in that, communications may be lost due to a number of reasons (e.g., collisions with other communications made by a hidden node, a wakening and listening only to determine that communications are actually ongoing over the network, etc.).

With respect to certain types of devices, such as Z class devices (e.g., alternatively referred to as sleep class device), energy and/or power savings (e.g., reduced functionality operation, low power operation, etc.) may be an important operational consideration (e.g., such as within battery powered operations). Awakening from a less than full power state (e.g., from a sleep state, from a reduced functionality state, etc.) to attempt a communication (e.g., transmission) and/or to monitor for communication activity on the communication medium can be very consumptive of energy and/or power. For example, when a device, such as a Z class device, wakes to a busy communication medium that device must wait for access attempt. Again, this may consume significant power in respective Listen, Receive, etc. states while waiting for backoff to countdown and between communication (e.g., transmission) attempts.

Herein, a novel solution is presented by which a device (e.g., Z class device) may perform a backoff snooze (e.g., a backoff countdown from a starting value, such as received from a beacon as provided from an access point (AP)) to allow the device (e.g., Z class device) to snooze during backoff countdown, and such operation may be performed independent of the state of the communication medium. Also, it is noted that such operation may be performed outside of a restricted access window (RAW) corresponding to a time period in which one or more communication devices of a first class (e.g., Z class) has access to the communication medium but other classes of devices do not. Such a window may alternatively be referred to as a UTIM window (which may alternatively be referred to as a restricted access window (RAW) or a Z class window) may be understood with respect to operation of different respective devices. For example, with respect to the different types of devices, a Z class device may be authorized to operate outside of the Z class window. However, an H class device may be characterized as never operating within a Z class window. A Z class window (or UTIM, RAW, etc.) may be characterized as ending after N idle L_SLOT slots, after UTIM or after deferral after a Wth clear to send (CTS) (whichever comes first). With respect to collisions occurring within a Z class window, a backoff (e.g., such as in accordance with an exponential backoff) may be executed across multiple UTIMs.

With respect to backoff snooze operation, if a communication (e.g., transmission) attempt fails, then a backoff snooze countdown is performed. Such a backoff may be counted while a given device (e.g., Z class device) is asleep, and this may be performed regardless of condition or state of the communication medium. Such operation may be performed to saves power. Even if such a device were awake, the effective probability of tracking the condition or state of the communication medium accurately may be relatively low. Relatively speaking, there can be a relatively high probability that a majority of other non-AP operative devices (e.g., STAs) might be hidden from at least energy detection (ED) and probably also Carrier Sense (CS) detect.

In some embodiments, such a backoff time increment (e.g., Z_SLOT) is equal to minimum wait time (e.g., Z_SLOT=maxPPDU+SIFS+ACK=MINWAIT time). Such a device (e.g., Z class device) may also perform preemption to make communication (e.g., transmission) attempt (e.g., under the assumption that synchronization of the state of the communication medium is attained).

Such a backoff snooze may be performed based on a codeword (e.g., such as from a codeword value received in a beacon such as received from an access point (AP)). Such a codeword for backoff snooze may be a separate value. For example, such a given AP may operate to include backoff snooze codeword value in beacons provided there from. As such, different respective backoff snooze codeword values can change dynamically (e.g., different respective backoff snoozes can be made based from different respective backoff snooze codeword values).

Figure 9:
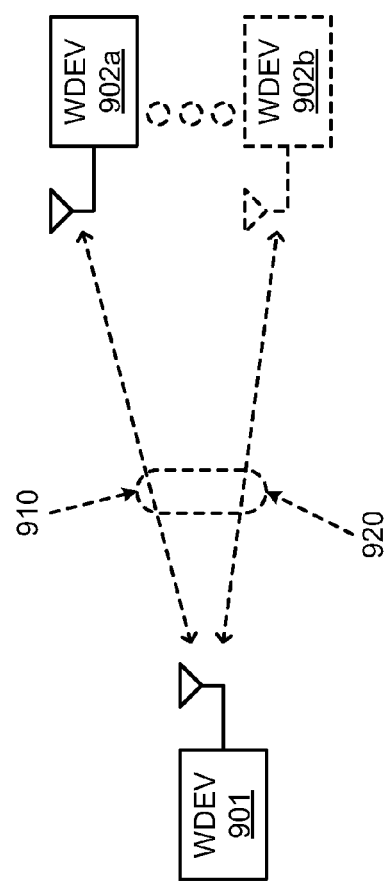
FIG. 9 is a diagram illustrating an embodiment of a wireless communication system including multiple wireless communication devices.

FIG. 9 is a diagram illustrating an embodiment 900 of a wireless communication system including multiple wireless communication devices. Generally speaking, the wireless communication system of this diagram includes a number of different respective wireless communication devices, depicted as wireless communication device (or generally, device, which are depicted as WDEVs in the diagram) 901, 902a through 902b. With respect to the devices 902a through 902b, it is noted that as few as two or generally any desired number of devices may be included therein (e.g., including up to several thousand devices or even more). One of these devices may be implemented to operate as an access point (AP), or as a manager, coordinator, or controller within the communication system. Other of the respective devices may be implemented to operate as non-AP devices, or wireless stations (e.g., STAs, SMSTAs, etc.).

Generally speaking, any one of the devices (e.g., 901, 902a through 902b), may be implemented to attempt a communication (e.g., transmission) to another one of the devices. If such a communication fails, that attempting device may then perform a backoff snooze countdown, and after the completion of such backoff snooze countdown, the device may re-attempt such communication, as shown by reference numeral 910. Also, in some embodiments, any one of the devices (e.g., 901, 902a through 902b), may be implemented to monitor for activity on the communication medium (e.g., monitor the air in a wireless communication system for any communications). If any activity is detected, that monitoring device may then perform a backoff snooze countdown, and after the completion of such backoff snooze countdown, either re-try or attempt a communication (e.g., transmission) to another one of the devices or resume monitoring for activity on the communication medium, as shown by reference numeral 920. This process may continue more than once (e.g., if activity is detected in any monitoring of the communication medium or after any transmission failure attempt), the operation of the device may continue.

Figure 10:
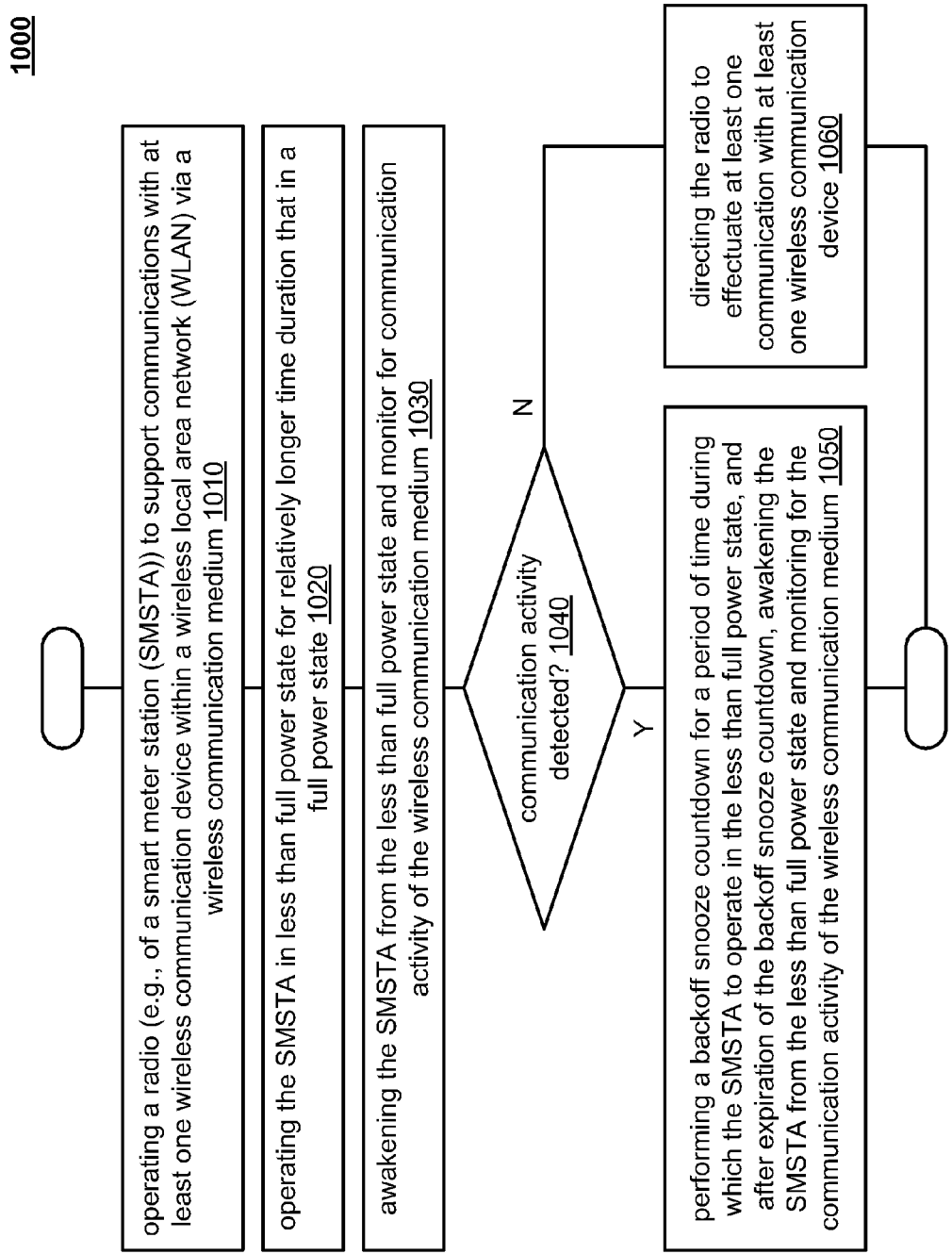

FIG. 10 and FIG. 11 are diagrams illustrating embodiments of methods 1000 and 1100, respectively, for operating one or more wireless communication devices.

Referring to method 1000 of FIG. 10, the method 1000 begins by operating a radio (e.g., of a smart meter station (SMSTA)) to support communications with at least one wireless communication device within a wireless local area network (WLAN) via a wireless communication medium, as shown in a block 1010. The method 1000 continues by operating the SMSTA in less than full power state for relatively longer time duration than in a full power state, as shown in a block 1020. The method 1000 then operates by awakening the SMSTA from the less than full power state and monitoring for communication activity of the wireless communication medium, as shown in a block 1030.

Then, if any communication activity is detected (per the decision block in decision block 1040), the method 1000 continues by performing a backoff snooze countdown for a period of time during which the SMSTA to operate in the less than full power state, and after expiration of the backoff snooze countdown, awakening the SMSTA from the less than full power state and monitor for the communication activity of the wireless communication medium, as shown in a block 1050.

Alternatively, if no communication activity is detected (per the decision block in decision block 1040), the method 1000 continues by directing the radio to effectuate at least one communication with at least one wireless communication device, as shown in a block 1060.

Referring to method 1100 of FIG. 11, the method 1100 begins by operating a radio (e.g., of an SMSTA) to attempt a transmission to at least one wireless communication device within a wireless local area network (WLAN) via a wireless communication medium, as shown in a block 1110.

Then, if such communication attempt fails (e.g., such as because of collision with another communication) (per the decision block in decision block 1120), the method 1100 continues by entering the SMSTA into a less than full power state (e.g., sleep, reduced functionality, power savings, etc.) and performing a backoff snooze countdown (e.g., from a codeword value received in a beacon [such as received from an AP], etc.), as shown in a block 1130. Alternatively, absent failure of the communication attempt (per the decision block in decision block 1120), the method 1100 continues by completing the transmission, as shown in a block 1140.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A smart meter station (SMSTA) comprising:
a communication interface; and
a processor, at least one of the communication interface or the processor configured to:
 receive, from a wireless communication device via a wireless communication medium, a signal that identifies at least one wireless communication device and specifies a time period during which only the at least one wireless communication device is authorized to transmit via the wireless communication medium during a time period;
 process the signal to determine whether the SMSTA is included within the at least one wireless communication device identified in the signal;
 operate the SMSTA in a power savings state when the SMSTA is determined not to be identified in the signal;

operate the SMSTA, when the SMSTA is determined to be identified in the signal, in the power savings state outside of the time period specified in the signal and monitor for communication activity of the wireless communication medium during the time period specified in the signal including to:
perform a backoff snooze countdown based on a first codeword value when communication activity is detected on the wireless communication medium, and after expiration of the backoff snooze countdown, monitor for the communication activity of the wireless communication medium; and
transmit another signal to the wireless communication device when no communication activity is detected on the wireless communication medium and then operate the SMSTA into the power savings state; and
operate the SMSTA in the power savings state and perform at least one additional backoff snooze countdown based on a second codeword value.

2. The SMSTA of claim 1, wherein at least one of the communication interface or the processor is further configured to:
awaken the SMSTA from the power savings state and attempt to transmit at least one other signal to the wireless communication device; and
when the attempt transmit at least one other signal to the wireless communication device fails, operate the SMSTA in the power savings state and perform at least one additional backoff snooze countdown.

3. The SMSTA of claim 1 further comprising:
a battery powered device configured to operate in the power savings state for at least one order of magnitude relatively longer time duration than in a full power state.

4. The SMSTA of claim 1, wherein the time period during which only the at least one wireless communication device is authorized to transmit via the wireless communication medium is specified based on a restricted access window (RAW) indicated within the signal.

5. The SMSTA of claim 1, wherein at least one of the communication interface or the processor is further configured to:
receive a beacon from an access point (AP), wherein the beacon includes the first codeword value.

6. The SMSTA of claim 1, wherein at least one of the communication interface or the processor is further configured to:
receive a beacon from an access point (AP), wherein the beacon includes the second codeword value.

7. The SMSTA of claim 1, wherein at least one of the communication interface or the processor is further configured to:
receive a first beacon from an access point (AP), wherein the first beacon includes the first codeword value; and
receive a second beacon from the (AP), wherein the second beacon includes the second codeword value.

8. The SMSTA of claim 1, wherein the wireless communication device is an access point (AP) or a wireless station (STA).

9. A method for execution by a smart meter station (SMSTA), the method comprising:
receiving, via a communication interface of the SMSTA and from a wireless communication medium, a signal that identifies at least one wireless communication device and specifies a time period during which only the at least one wireless communication device is authorized to transmit via the wireless communication medium during a time period;
processing the signal to determine whether the SMSTA is included within the at least one wireless communication device identified in the signal;
when the SMSTA is determined not to be identified in the signal, operating the SMSTA in a power savings state;
when the SMSTA is determined to be identified in the signal, operating the SMSTA in the power savings state outside of the time period specified in the signal and monitoring for communication activity of the wireless communication medium during the time period specified in the signal including:
performing a backoff snooze countdown based on a first codeword value when communication activity is detected on the wireless communication medium, and after expiration of the backoff snooze countdown, monitoring for the communication activity of the wireless communication medium; and
transmitting another signal to the wireless communication device when no communication activity is detected on the wireless communication medium and then operate the SMSTA into the power savings state; and
operating the SMSTA in the power savings state and performing at least one additional backoff snooze countdown based on a second codeword value.

10. The method of claim 9 further comprising:
awakening the SMSTA from the power savings state and attempting to transmit at least one other signal to the wireless communication device; and
when the attempting to transmit at least one other signal to the wireless communication device fails, operating the SMSTA in the power savings state and performing at least one additional backoff snooze countdown.

11. The method of claim 9 further comprising:
operating the SMSTA in the power savings state for at least one order of magnitude relatively longer time duration than in a full power state.

12. The method of claim 9, wherein the time period during which only the at least one wireless communication device is authorized to transmit via the wireless communication medium is specified based on a restricted access window (RAW) indicated within the signal.

13. The method of claim 9 further comprising:
receiving a beacon from an access point (AP), wherein the beacon includes the first codeword value or the second codeword value.

14. The method of claim 9 further comprising:
receiving a first beacon from an access point (AP), wherein the first beacon includes the first codeword value; and
receiving a second beacon from the (AP), wherein the second beacon includes the second codeword value.

15. The method of claim 9, wherein the wireless communication device is an access point (AP) or a wireless station (STA).

16. A smart meter station (SMSTA) comprising:
a communication interface; and
a processor, at least one of the communication interface or the processor configured to:
receive, from a wireless communication device via a wireless communication medium, a first signal that identifies at least one wireless communication device and specifies a time period during which only the at least one wireless communication device is authorized to transmit via the wireless communication medium during a time period;

process the first signal to determine whether the SMSTA is included within the at least one wireless communication device identified in the first signal;

operate the SMSTA in a power savings state when the SMSTA is determined not to be identified in the first signal;

operate the SMSTA, when the SMSTA is determined to be identified in the first signal, in the power savings state outside of the time period specified in the signal and monitor for communication activity of the wireless communication medium during the time period specified in the first signal including to:

perform a backoff snooze countdown based on a first codeword value when communication activity is detected on the wireless communication medium, and after expiration of the backoff snooze countdown, monitor for the communication activity of the wireless communication medium; and transmit a second signal to the wireless communication device when no communication activity is detected on the wireless communication medium and then operate the SMSTA into the power savings state; and operate the SMSTA, when the SMSTA is determined to be identified in the first signal, in a full power state inside of the time period specified in the signal and perform at least one of a sensing operation or a measurement operation to generate at least one of sensing data or measurement data for transmission to the wireless communication device; and operate the SMSTA in the power savings state and perform at least one additional backoff snooze countdown based on a second codeword value.

17. The SMSTA of claim 16, wherein at least one of the communication interface or the processor is further configured to:

operate the SMSTA, when the SMSTA is determined to be identified in the signal, in the full power state inside a first portion of the time period specified in the signal to perform the at least one of the sensing operation or the measurement operation and in the full power state inside a second portion of the time period specified in the signal to transmit the at least one of sensing data or measurement data to the wireless communication device.

18. The SMSTA of claim 16 further comprising:

a battery powered device configured to operate in the power savings state for at least one order of magnitude relatively longer time duration than in the full power state.

19. The SMSTA of claim 16, wherein at least one of the communication interface or the processor is further configured to:

receive a beacon from an access point, wherein the beacon includes the first codeword value or the second codeword value.

20. The SMSTA of claim 16, wherein the wireless communication device is an access point (AP) or a wireless station (STA).

* * * * *